United States Patent
Hase et al.

(10) Patent No.: US 12,458,326 B2
(45) Date of Patent: Nov. 4, 2025

(54) ULTRASOUND PROBE AND ULTRASOUND DIAGNOSTIC APPARATUS

(71) Applicant: FUJIFILM Corporation, Tokyo (JP)

(72) Inventors: Takatoshi Hase, Kanagawa (JP); Atsushi Osawa, Kanagawa (JP); Ryo Shintate, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 69 days.

(21) Appl. No.: 18/474,611

(22) Filed: Sep. 26, 2023

(65) Prior Publication Data

US 2024/0099702 A1    Mar. 28, 2024

(30) Foreign Application Priority Data

Sep. 28, 2022 (JP) ................................. 2022-155445
Feb. 22, 2023 (JP) ................................. 2023-025932

(51) Int. Cl.
A61B 8/00    (2006.01)

(52) U.S. Cl.
CPC ............ *A61B 8/546* (2013.01); *A61B 8/4483* (2013.01)

(58) Field of Classification Search
CPC .................... A61B 8/546; A61B 8/4483
See application file for complete search history.

(56) References Cited

U.S. PATENT DOCUMENTS

| | | | |
|---|---|---|---|
| 2005/0075573 A1* | 4/2005 | Park ....................... | A61B 8/12 600/459 |
| 2012/0007472 A1* | 1/2012 | Tai ......................... | B06B 1/0644 29/25.35 |
| 2012/0143060 A1* | 6/2012 | Weekamp ............ | B06B 1/0622 216/13 |
| 2015/0270474 A1* | 9/2015 | Osawa .................. | G10K 9/22 310/327 |

FOREIGN PATENT DOCUMENTS

| | | |
|---|---|---|
| JP | 2015-181541 A | 10/2015 |
| JP | 2020-175049 A | 10/2020 |

* cited by examiner

*Primary Examiner* — Keith M Raymond
*Assistant Examiner* — Adam D. Kolkin
(74) *Attorney, Agent, or Firm* — Studebaker Brackett PLLC

(57) ABSTRACT

An ultrasound probe includes: a plurality of vibrators that are arranged in a left-right direction; a support portion that supports a lower surface of the vibrator; an acoustic matching portion; and an acoustic lens, in which the support portion includes a dematching layer and a backing layer, and the dematching layer is in contact with only one of both end surfaces of the vibrator in a front-rear direction.

11 Claims, 12 Drawing Sheets

ULTRASOUND PROBE AND ULTRASOUND DIAGNOSTIC APPARATUS

CROSS-REFERENCE TO RELATED APPLICATIONS

This application is based upon and claims the benefit of priority from prior Japanese patent application No. 2022-155445, filed on Sep. 28, 2022, and Japanese patent application No. 2023-25932, filed on Feb. 22, 2023 the entire contents of which are incorporated herein by reference.

BACKGROUND OF THE INVENTION

1. Field of the Invention

The present invention relates to an ultrasound probe and an ultrasound diagnostic apparatus.

2. Description of the Related Art

JP2015-181541A describes an ultrasound probe comprising: a backing material, a plurality of piezoelectric elements arranged on a surface of the backing material, a heat collection portion that has at least one heat conduction path extending in a thickness direction inside the backing material and of which a distal end portion is exposed from the surface of the backing material, which faces lower surfaces of the plurality of piezoelectric elements, that is made of a material having a thermal conductivity higher than a thermal conductivity of the backing material, and that absorbs heat from the plurality of piezoelectric elements, and a heat discharge portion that is connected to the heat collection portion and that discharges the heat absorbed by the heat collection portion to an outside.

SUMMARY OF THE INVENTION

In an ultrasound diagnostic apparatus for a medical use, an ultrasound image is generated by transmitting an ultrasound beam from an ultrasound probe toward a subject under examination, receiving an ultrasound wave from the subject under examination through an ultrasound probe, and electrically processing a reception signal thereof. In recent years, with the advancement in performance of the ultrasound probe and the ultrasound diagnostic apparatus, various types of driving have been applied to a vibrator inside the ultrasound probe. As a result, there is a tendency for an increased amount of heat generation of the ultrasound probe. Therefore, it is required to suppress transfer of heat generated by the ultrasound probe to the subject under examination.

An object of the present disclosure is to provide an ultrasound probe capable of restraining heat from being transferred to a subject under examination, and an ultrasound diagnostic apparatus comprising the same.

According to one aspect of the present disclosure, there is provided an ultrasound probe comprising: a plurality of transducers that are arranged in a first direction, each vibrator having a first surface which is located on a side on which the vibrator transmits and receives an ultrasound wave and a second surface opposite to the first surface; and a support portion that supports the second surface, in which the support portion includes a first support portion that is in contact with the second surface and that reflects, to the vibrator, an ultrasound wave from the vibrator toward the support portion, a direction from the vibrator toward the support portion is defined as a second direction, a direction intersecting the first direction and the second direction is defined as a third direction, and the first support portion is in contact with at least a part of an end surface of the vibrator in the third direction.

According to one aspect of the present disclosure, there is provided an ultrasound diagnostic apparatus comprising: the ultrasound probe described above.

According to the present disclosure, it is possible to provide an ultrasound probe capable of restraining heat from being transferred to a subject under examination, and an ultrasound diagnostic apparatus comprising the same.

DESCRIPTION OF THE PREFERRED EMBODIMENTS

Figure 1:
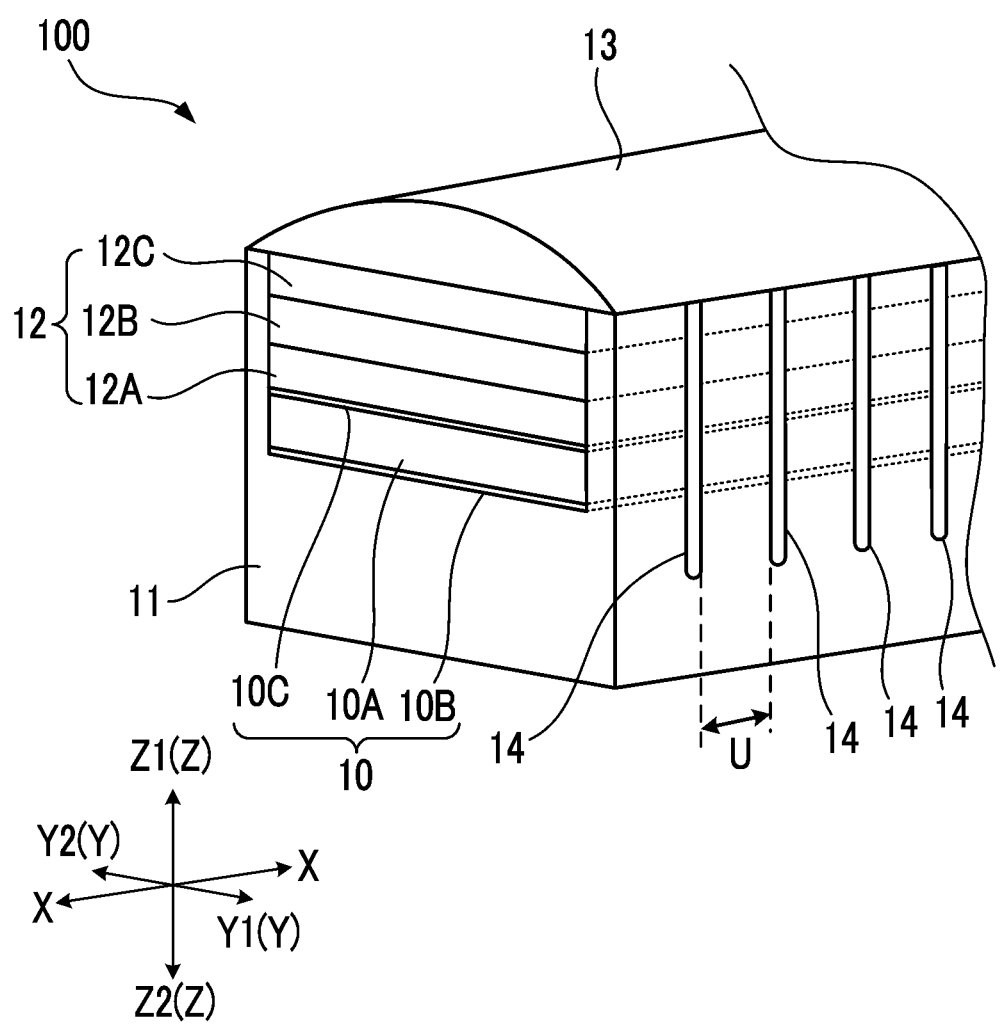
FIG. 1 is a perspective view partially showing a distal end part of an ultrasound probe 100 of one aspect according to the present disclosure.

FIG. 1 is a perspective view partially showing a distal end part of an ultrasound probe 100 of one aspect according to the present disclosure. FIG. 1 shows three directions (a left-right direction X, a front-rear direction Y, and an up-down direction Z) that are orthogonal to each other as directions of the ultrasound probe 100. One of the up-down direction Z is referred to as an upward direction Z1, and a direction opposite to the upward direction Z1 is referred to as a downward direction Z2. One of the front-rear direction Y is referred to as a rearward direction Y1, and a direction opposite to the rearward direction Y1 is referred to as a forward direction Y2. The ultrasound probe 100 is used by bringing an upper-side end surface thereof into contact with a subject under examination. The left-right direction X and the front-rear direction Y are each a direction along a plane (one of the planes intersecting the up-down direction Z) perpendicular to the up-down direction Z. In the present specification, the left-right direction X constitutes a first direction, the downward direction Z2 constitutes a second direction toward a support portion 11S from a vibrator 10, which will be described below, and the front-rear direction Y constitutes a third direction. The front-rear direction Y is a direction intersecting the left-right direction X and the downward direction Z2.

The ultrasound probe 100 is an image generation device provided in the ultrasound diagnostic apparatus. The ultrasound diagnostic apparatus includes a device that generates and records an ultrasound image while bringing the ultrasound probe 100 into proximity with an outer surface of the subject under examination, a device that generates and records an ultrasound image while bringing the ultrasound probe 100 incorporated into an insertion part distal end of an endoscope into proximity with an organ of the subject under examination, or the like.

As shown in FIG. 1, the ultrasound probe 100 comprises a plurality of units U arranged in the left-right direction X, and an acoustic lens 13 provided on an upper side with respect to the plurality of units U and common to the plurality of units U. Adjacent units U are separated by a separation layer 14. The separation layer 14 is formed of an insulating resin material or the like. The unit U has a substantially plate shape, and a thickness direction thereof coincides with the left-right direction X.

The unit U comprises the vibrator 10, an acoustic matching portion 12 disposed on the upper side with respect to the vibrator 10, and a functional part 11 provided around the vibrator 10 and the acoustic matching portion 12. Although not shown in FIG. 1, the acoustic lens 13, the plurality of units U, and the separation layer 14 are supported by a case 15 (see FIG. 2).

The vibrator 10 comprises a piezoelectric body 10A, a signal electrode 10B stuck to a lower-side surface of the piezoelectric body 10A, and a ground electrode 10C stuck to an upper-side surface of the piezoelectric body 10A. The piezoelectric body 10A generates an ultrasound wave in response to a voltage application and generates a reception voltage in a case where a reflected wave of the ultrasound wave is received. The piezoelectric body 10A is made of a piezoelectric ceramics, such as lead zirconate titanate (PZT), or a piezoelectric material, such as a polymer material, like polyvinylidene fluoride (PVDF) or the like. The piezoelectric body 10A may be composed of capacitive micro ultrasound transducers (CMUT), which are based on a semiconductor material, or the like. Examples of the material used for the ground electrode 10C and the signal electrode 10B include gold (Au), platinum (Pt), silver (Ag), palladium (Pd), copper (Cu), aluminum (Al), nickel (Ni), or tin (Sn).

The vibrator 10 transmits ultrasound waves from an upper-side surface toward the subject under examination and receives the ultrasound waves reflected from the subject under examination on the upper-side surface. That is, the upper-side surface of the vibrator 10 constitutes a first surface which is located on a side on which the ultrasound waves are transmitted and received. A lower-side surface of the vibrator 10 constitutes a second surface opposite to the first surface.

The acoustic matching portion 12 is provided in order to efficiently transmit and receive ultrasound waves by matching acoustic impedances of the piezoelectric body 10A and the subject under examination. The acoustic matching portion 12 is preferably formed of a material having an acoustic impedance that is a value lower than the acoustic impedance of the piezoelectric body 10A and higher than the acoustic impedance of the subject under examination.

In the present embodiment, the acoustic matching portion 12 is formed by laminating a plurality of layers formed of such a material in the up-down direction Z. Specifically, the acoustic matching portion 12 comprises a first acoustic matching layer 12A stuck to an upper-side surface of the vibrator 10, a second acoustic matching layer 12B stuck to an upper-side surface of the first acoustic matching layer 12A, and a third acoustic matching layer 12C stuck to an upper-side surface of the second acoustic matching layer 12B. It is preferable that the acoustic matching portion 12 has a layered structure in which the acoustic impedance decreases in a stepwise manner from the vibrator 10 toward the subject under examination. The acoustic matching portion 12 may have a single-layer structure instead of a multi-layer structure.

The acoustic lens 13 is provided in order to improve a resolving power by using refraction to focus the ultrasound beam. The acoustic lens 13 is generally composed of a convex type. The acoustic lens 13 is made of, for example, a silicone resin or plastic. The acoustic lens 13 is stuck to upper surfaces of the acoustic matching portions 12 in all the units U and an upper surface of the separation layer 14 between the units U with an adhesive or the like.

In the ultrasound probe 100, by applying a pulsed or continuous wave-like voltage between the ground electrodes 10C and the signal electrodes 10B of a plurality of the vibrators 10, each of the piezoelectric bodies 10A expands and contracts to generate a pulsed or continuous wave-like ultrasound wave. In a case where these ultrasound waves are incident on the subject under examination via the acoustic matching portion 12 and the acoustic lens 13, the ultrasound waves are combined with each other to form an ultrasound beam and propagate through the subject under examination. In a case where an ultrasound wave propagating through and reflected in the subject under examination is incident on each of the piezoelectric bodies 10A via the acoustic lens 13 and the acoustic matching portion 12, each of the piezoelectric bodies 10A vibrates (expands and contracts), and in response to this vibration, a signal voltage is generated between the ground electrode 10C and the signal electrode 10B. The signal voltage generated in the plurality of vibrators 10 is extracted from between the ground electrode 10C and the signal electrode 10B of each of the vibrators 10 and received as a reception signal, and an ultrasound image is generated based on the reception signal. As described above, the ultrasound image is generated based on the signal voltage generated in response to the vibration of the piezoelectric body 10A in the up-down direction Z. By receiving the ultrasound waves, the piezoelectric body 10A vibrates not only in the up-down direction Z but also in the front-rear direction Y. Therefore, it is important that a frequency band of the vibration of the piezoelectric body 10A in the up-down direction Z and a resonance frequency of the vibration of the piezoelectric body 10A in the front-rear direction Y are as far apart as possible in order to improve the quality of the ultrasound image.

Figure 2:
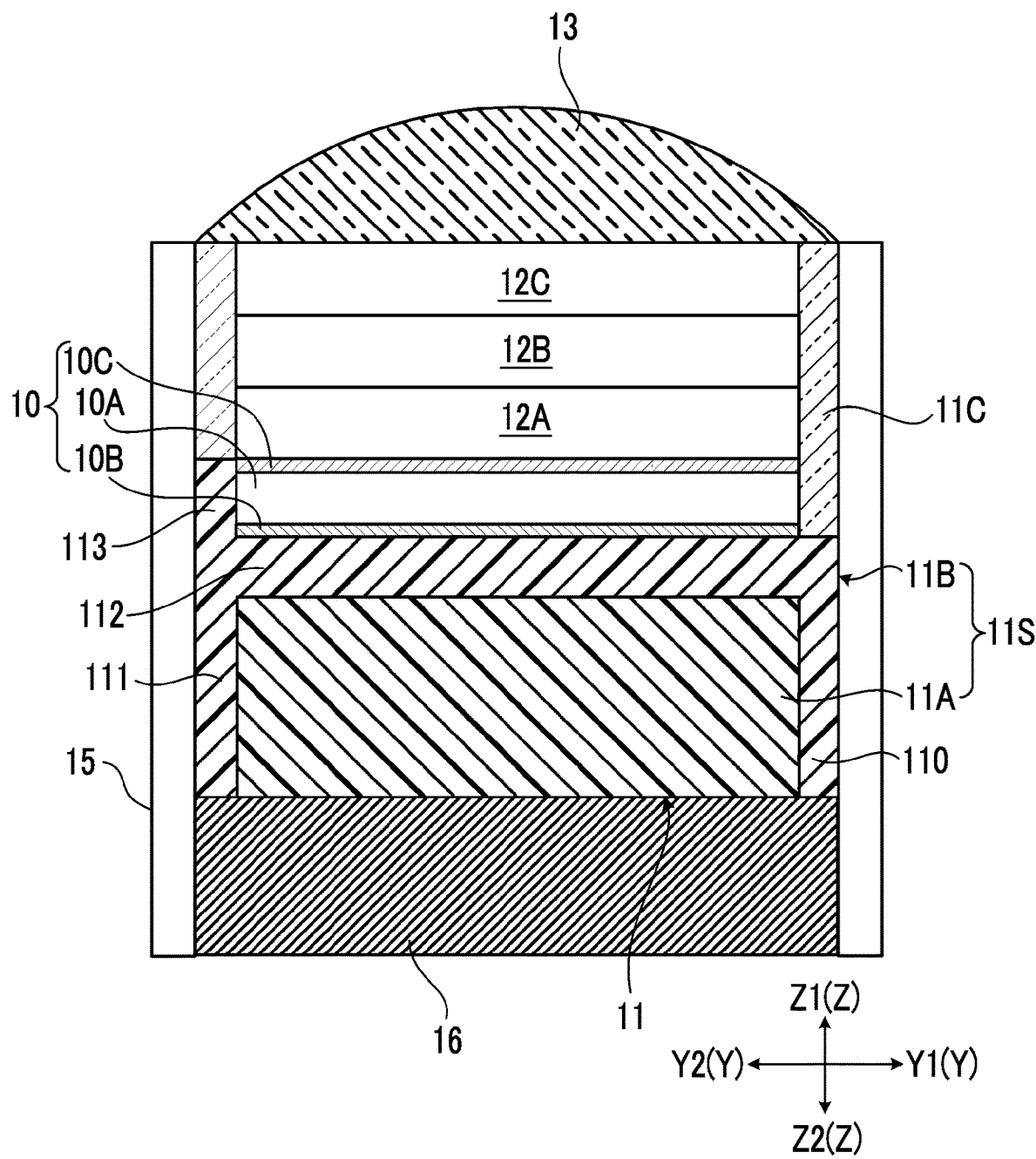
FIG. 2 is a schematic view showing a cross-section of a unit U perpendicular to a left-right direction X.

FIG. 2 is a schematic view showing a cross-section of the unit U perpendicular to the left-right direction X. As shown in FIG. 2, the functional part 11 comprises the support portion 11S that supports the lower-side surface of the vibrator 10, and a protective layer 11C that is provided between the support portion 11S and the acoustic lens 13 and that protects end surfaces of the acoustic matching portion 12 and of the vibrator 10 in the front-rear direction Y.

The support portion 11S comprises a dematching layer 11B that is in contact with the lower-side surface of the vibrator 10 and that has a function of reflecting, to the vibrator 10, an ultrasound wave from the vibrator 10 toward the support portion 11S, and a backing layer 11A that is disposed on an opposite side (on a lower side) of the dematching layer 11B from the vibrator 10 side and that restrains the ultrasound wave from the vibrator 10 toward the support portion 11S from returning to the vibrator 10. The dematching layer 11B constitutes a first support portion, and the backing layer 11A constitutes a second support portion. Although not shown, an electrode connected to each of the ground electrode 10C and the signal electrode 10B is provided in the support portion 11S.

The dematching layer 11B is made of a material having an acoustic impedance higher than an acoustic impedance of the vibrator 10. The dematching layer 11B is mainly made of, for example, tungsten, tungsten carbide, or the like.

The backing layer 11A is made of a material that has an absorbent property of ultrasound waves and that has a vibration damping property which removes unnecessary weak vibrations from a vibration component of the vibrator 10. The backing layer 11A is mainly made of, for example, a urethane resin, an epoxy resin, a silicone resin, or the like.

In general, a thermal expansion coefficient of the dematching layer 11B is smaller than a thermal expansion coefficient of the backing layer 11A, and a thermal conductivity of the backing layer 11A is lower than a thermal conductivity of the dematching layer 11B. In the present embodiment, as will be described below, by using the dematching layer 11B, which is difficult to expand, as a heat dissipation path, it is possible to improve heat dissipation performance, reduce strain between the backing layer 11A and the dematching layer 11B, and improve thermal durability. It is preferable that the thermal conductivity of the dematching layer 11B is higher than the thermal conductivity of the vibrator 10.

The dematching layer 11B is in contact with a front end surface of both end surfaces of the vibrator 10 in the front-rear direction Y. Specifically, the dematching layer 11B comprises a rear wall part 110 that is provided between a rear end surface of the backing layer 11A and the case 15, a front wall part 111 that is provided between a front end surface of the backing layer 11A and the case 15, an upper wall part 112 that connects an upper end of the rear wall part 110 and an upper end of the front wall part 111 to each other and that is in contact with a lower surface of the vibrator 10, and an extending part 113 that extends from a front end part of the upper wall part 112 in the upward direction Z1, between the case 15 and the vibrator 10, and that is in contact with a front end surface of the vibrator 10.

The protective layer 11C is provided between the case 15 and a front end surface of the acoustic matching portion 12, and between the case 15 and rear end surfaces of the acoustic matching portion 12 and of the vibrator 10. It is preferable that the protective layer 11C is configured to have an acoustic impedance lower than the acoustic impedance of the vibrator 10. The protective layer 11C is made of, for example, an insulating material such as a resin, but is preferably made of the same material as that of the acoustic lens 13. In a case where the protective layer 11C is made of the same material as that of the acoustic lens 13, the acoustic lens 13 and the protective layer 11C can be integrally molded, which makes it possible to reduce the manufacturing cost of the ultrasound probe 100.

In the examples of FIGS. 1 and 2, the acoustic lens 13 is in contact with an upper surface of the protective layer 11C located on the front side, an upper surface of the protective layer 11C located on the rear side, and the upper surface of the acoustic matching portion 12.

As shown in FIG. 2, the ultrasound probe 100 further comprises a heat dissipation member 16 disposed below the support portion 11S. The heat dissipation member 16 is in contact with a lower surface of the dematching layer 11B and a lower surface of the backing layer 11A via an adhesive or the like. The heat dissipation member 16 preferably has a thermal conductivity equivalent to or higher than the thermal conductivity of the dematching layer 11B and can be made of a metal such as copper, aluminum, or gold.

In the ultrasound probe 100 having the above configuration, the dematching layer 11B is in contact with the lower surface and the front end surface of the vibrator 10 that generates heat during operation. Therefore, the heat generated in the vibrator 10 is transferred to the dematching layer 11B having a high thermal conductivity and further transferred to the heat dissipation member 16 connected to the dematching layer 11B. As described above, with the ultrasound probe 100, the safety with respect to the subject under examination can be enhanced by reducing the heat transferred to the acoustic lens 13 on a subject under examination side.

Further, in the ultrasound probe 100, the dematching layer 11B is in contact with the front end surface of the vibrator 10 and is not in contact with the rear end surface of the vibrator 10. According to this configuration, only the front end surface of the front end surface and the rear end surface of the vibrator 10 serves as a fixed end of the vibration in the front-rear direction Y. Therefore, it is possible to increase the difference between the resonance frequency of the vibration of the vibrator 10 in the front-rear direction Y and the frequency of the vibration of the vibrator 10 in the up-down direction Z. As a result, in a case where the ultrasound image is generated using the vibration of the vibrator 10 in the up-down direction Z, the influence of the signal voltage corresponding to the vibration of the vibrator 10 in the front-rear direction Y on the image quality can be reduced, so that the quality of the ultrasound image can be improved.

Further, in the ultrasound probe 100, the dematching layer 11B is configured to be in contact with the front end surface and the rear end surface of the backing layer 11A. According to this configuration, the dematching layer 11B can be disposed wider in a region opposite to the subject under examination side. Therefore, the heat generated in the vibrator 10 can be more efficiently dissipated to the side opposite to the subject under examination side.

In the ultrasound probe 100 having the configuration shown in FIG. 2, a configuration may be employed in which one or both of the front wall part 111 and the rear wall part 110 are deleted, and the backing layer 11A is formed in the deleted region. In the configuration in which the front wall part 111 and the rear wall part 110 are deleted, for example, by employing a configuration in which a portion of the case 15, which is in contact with the dematching layer 11B, has a thermal conductivity equivalent to the thermal conductivity of the heat dissipation member 16, heat transferred from the vibrator 10 to the acoustic lens 13 can be reduced.

Figure 3:
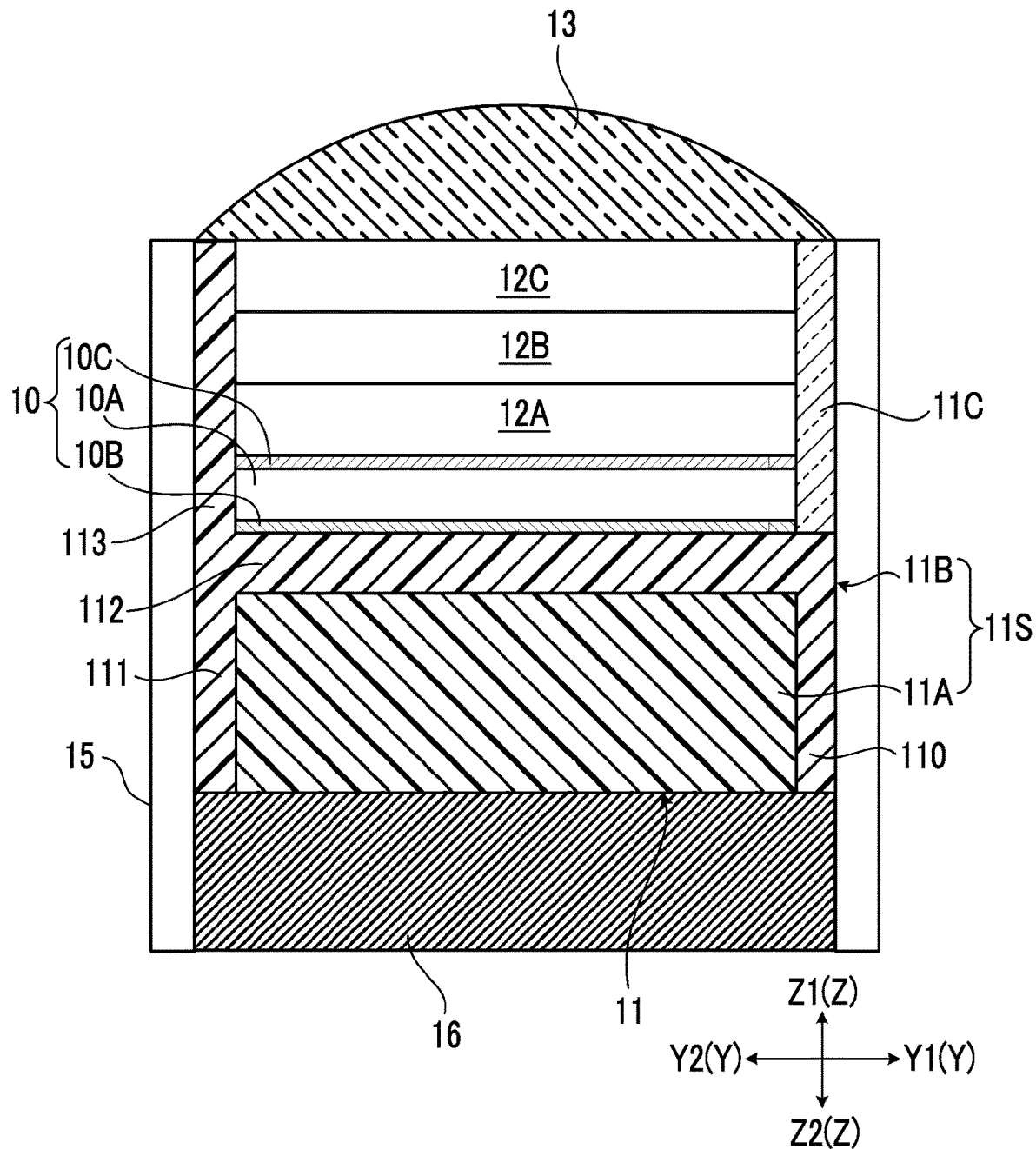
FIG. 3 is a view showing a first modification example of the ultrasound probe 100 and is a schematic cross-sectional view corresponding to FIG. 2.

FIG. 3 is a view showing a first modification example of the ultrasound probe 100 and is a schematic cross-sectional view corresponding to FIG. 2. The ultrasound probe 100 shown in FIG. 3 has the same configuration as that of FIG.

2 except that an upper end surface of the extending part 113 extends in the upward direction Z1 to a position in contact with the acoustic lens 13.

According to the configuration shown in FIG. 3, the dematching layer 11B can also be brought into contact with the front end surface of the acoustic matching portion 12. Therefore, it is possible to transfer the heat generated in the vibrator 10, particularly the heat moved to the acoustic matching portion 12, from the acoustic matching portion 12 to the dematching layer 11B. As a result, the heat transferred to the subject under examination can be further reduced.

Further, according to the configuration shown in FIG. 3, since the extending part 113 and the acoustic lens 13 are in contact with each other, the heat moved from the vibrator 10 to the acoustic lens 13 can be dissipated to the dematching layer 11B via a contact surface between the acoustic lens 13 and the extending part 113. As a result, the heat transferred to the subject under examination can be further reduced.

Figure 4:
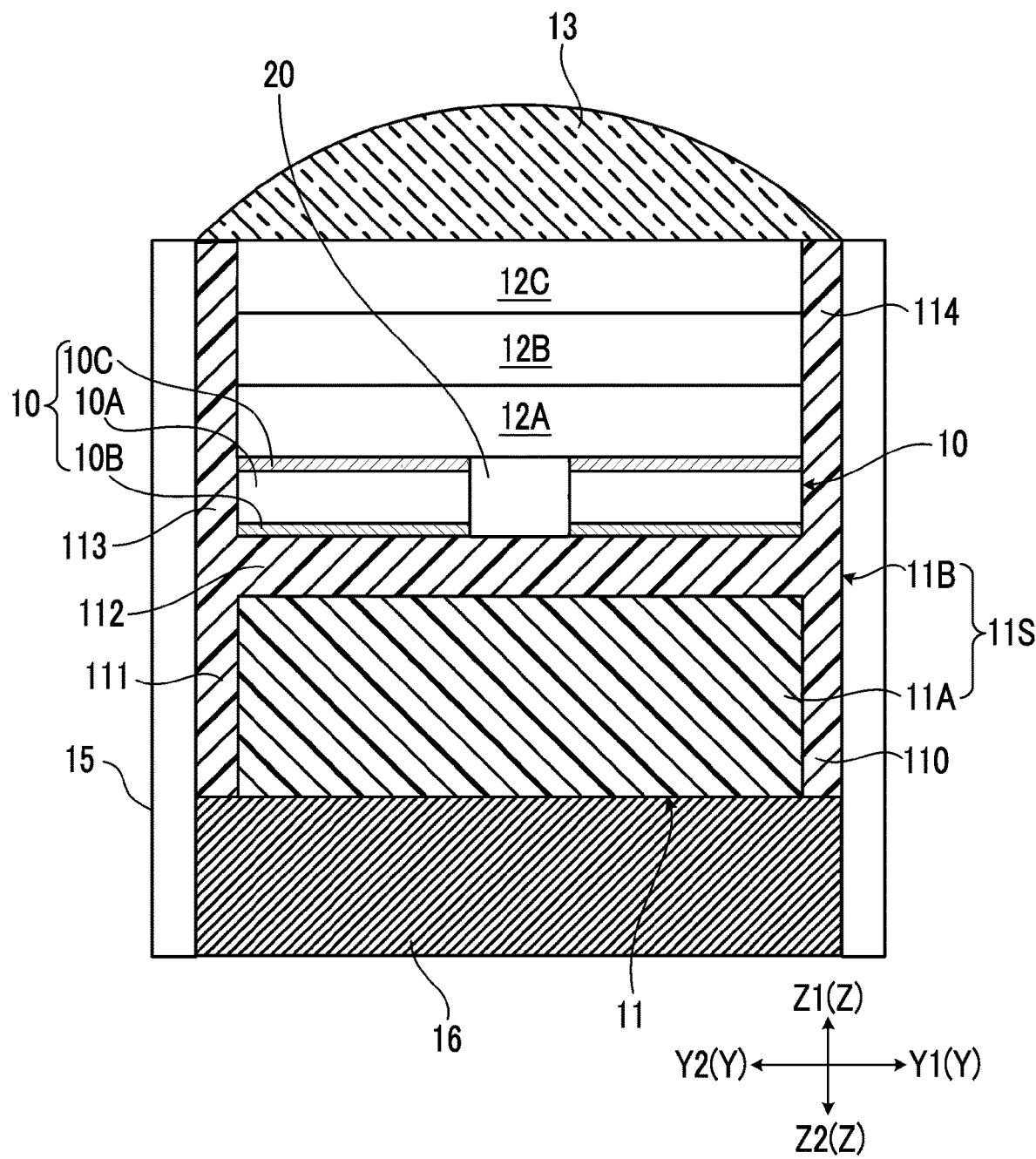
FIG. 4 is a view showing a second modification example of the ultrasound probe 100 and is a schematic cross-sectional view corresponding to FIG. 2.

FIG. 4 is a view showing a second modification example of the ultrasound probe 100 and is a schematic cross-sectional view corresponding to FIG. 2. The ultrasound probe 100 shown in FIG. 4 has a configuration in which an extending part 114 and a separation layer 20 are added to the ultrasound probe 100 shown in FIG. 3. The extending part 114 is provided to extend from a rear end part of the upper wall part 112 in the upward direction Z1, between the case 15 and the vibrator 10, to a position in contact with the acoustic lens 13. The extending part 114 is in contact with the rear end surfaces of the vibrator 10 and of the acoustic matching portion 12 and the lower surface of the acoustic lens 13.

The separation layer 20 is formed to extend from an upper surface of a central part of the upper wall part 112 in the front-rear direction Y to the first acoustic matching layer 12A. It is preferable that the separation layer 20 is made of an insulating material and is configured to have an acoustic impedance lower than the acoustic impedance of the vibrator 10.

The ultrasound probe 100 shown in FIG. 4 is of a so-called composite type and has a configuration in which the vibrator 10 provided in the unit U is divided into two in the front-rear direction Y by the separation layer 20. That is, the ultrasound probe 100 shown in FIG. 4 has a configuration in which two vibrator groups each of which includes the plurality of vibrators 10 arranged in the left-right direction X are arranged in the front-rear direction Y.

According to the configuration shown in FIG. 4, for the vibrator 10 located on the front side in the unit U, the dematching layer 11B is in contact with only the front end surface among the front end surface and the rear end surface thereof, and, for the vibrator 10 located on the rear side in the unit U, the dematching layer 11B is in contact with only the rear end surface of the front end surface and the rear end surface thereof. That is, in each of the two vibrators 10 provided in the unit U, only one end surface in the front-rear direction Y serves as a fixed end. Therefore, as described above, the quality of the ultrasound image can be improved.

Further, according to the configuration shown in FIG. 4, the extending part 114 is in contact with each of the acoustic matching portion 12 and the acoustic lens 13. That is, the contact area of the dematching layer 11B with respect to each of the acoustic matching portion 12 and the acoustic lens 13 can be increased as compared with the configuration of FIG. 3. As a result, the heat generated in the vibrator 10 can be more efficiently dissipated to the heat dissipation member 16.

In the ultrasound probe 100 shown in FIG. 4, a configuration can also be employed in which an upper end surface of the separation layer 20 extends to a position in contact with the acoustic lens 13.

Figure 5:
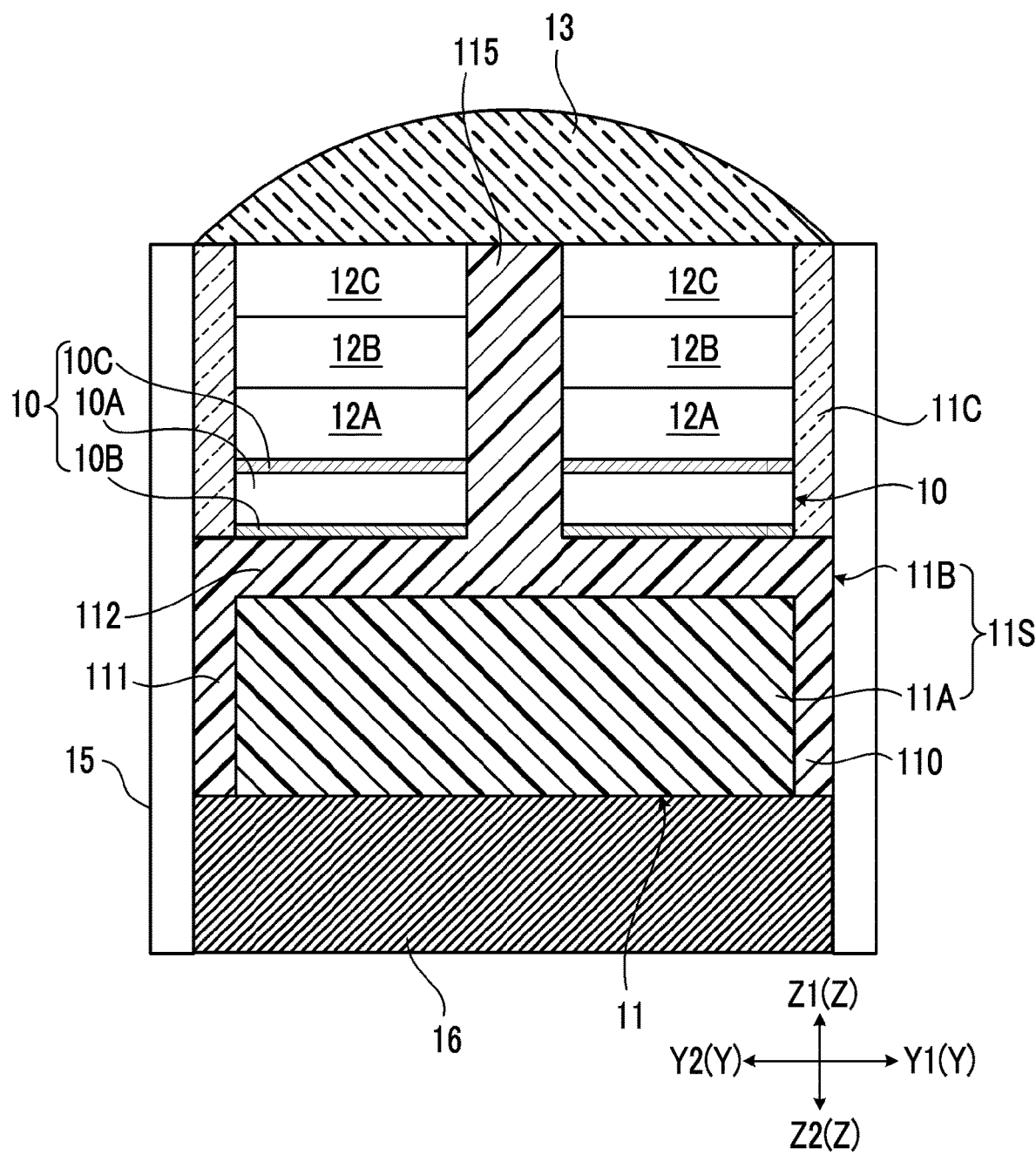
FIG. 5 is a view showing a third modification example of the ultrasound probe 100 and is a schematic cross-sectional view corresponding to FIG. 2.

FIG. 5 is a view showing a third modification example of the ultrasound probe 100 and is a schematic cross-sectional view corresponding to FIG. 2. The ultrasound probe 100 shown in FIG. 5 has a configuration in which the extending part 113 is deleted and instead, an extending part 115 is added with respect to the ultrasound probe 100 shown in FIG. 2.

The ultrasound probe 100 shown in FIG. 5 is of a so-called composite type and has a configuration in which the acoustic matching portion 12 and the vibrator 10 provided in the unit U are divided into two in the front-rear direction Y by the extending part 115. The extending part 115 extends from the central part of the upper wall part 112 in the front-rear direction Y to a position in contact with the acoustic lens 13. The extending part 115 is in contact with the rear end surfaces of the acoustic matching portion 12 and of the vibrator 10, which are located on the front side in the unit U, the front end surfaces of the acoustic matching portion 12 and of the vibrator 10, which are located on the rear side in the unit U, and the lower surface of the acoustic lens 13.

The entire ultrasound probe 100 shown in FIG. 5 has a configuration in which two vibrator groups each of which includes the plurality of vibrators 10 arranged in the left-right direction X are arranged in the front-rear direction Y.

According to the configuration shown in FIG. 5, for the vibrator 10 located on the front side in the unit U, the dematching layer 11B is in contact with only the rear end surface among the front end surface and the rear end surface thereof, and, for the vibrator 10 located on the rear side in the unit U, the dematching layer 11B is in contact with only the front end surface of the front end surface and the rear end surface thereof. That is, in each of the two vibrators 10 provided in the unit U, only one end surface in the front-rear direction Y serves as a fixed end. Therefore, as described above, the quality of the ultrasound image can be improved.

Figure 6:
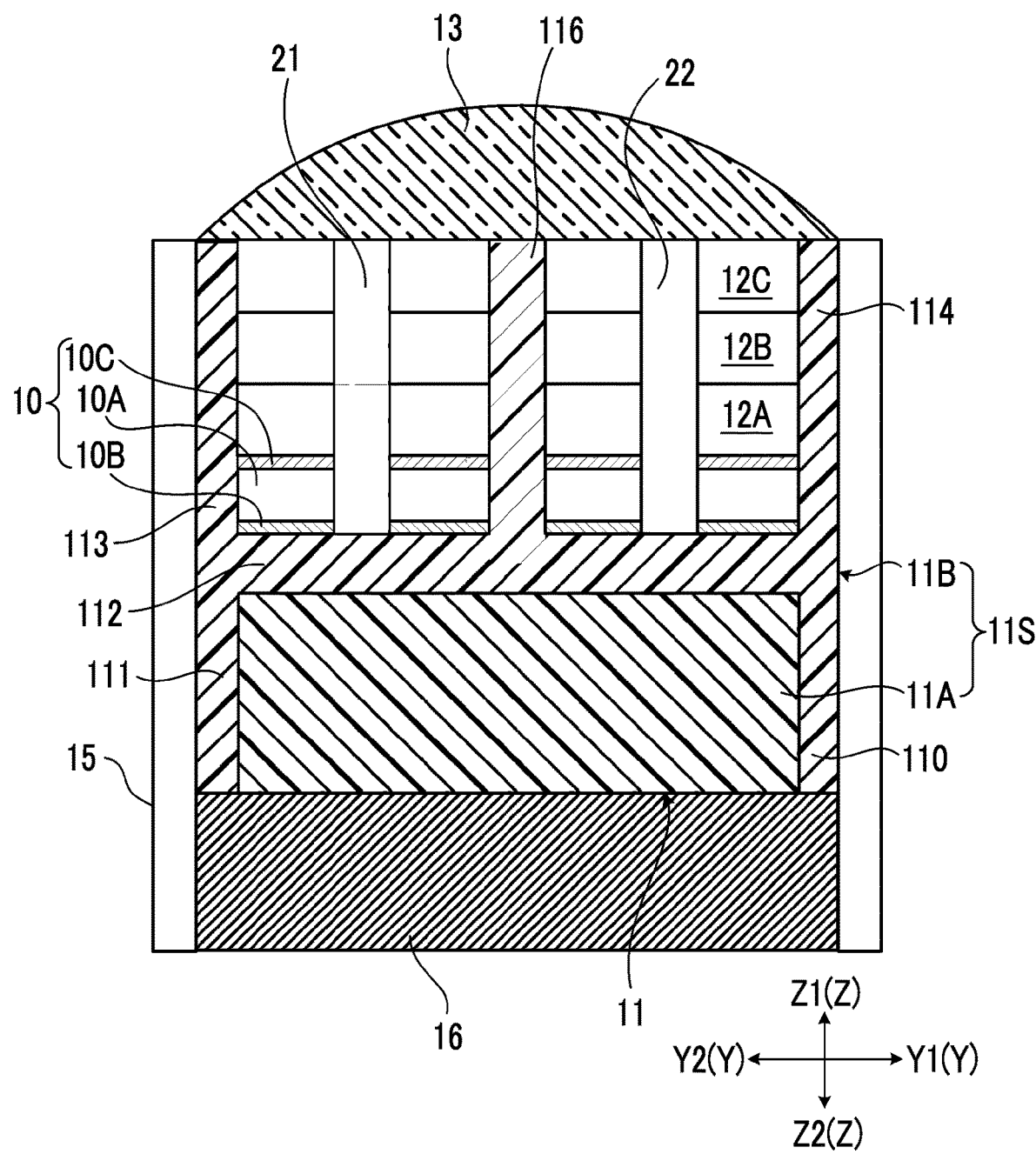
FIG. 6 is a view showing a fourth modification example of the ultrasound probe 100 and is a schematic cross-sectional view corresponding to FIG. 2.

FIG. 6 is a view showing a fourth modification example of the ultrasound probe 100 and is a schematic cross-sectional view corresponding to FIG. 2. The ultrasound probe 100 shown in FIG. 6 has a configuration in which the separation layer 20 is deleted and instead, a separation layer 21, a separation layer 22, and an extending part 116 are added with respect to the ultrasound probe 100 shown in FIG. 4.

The ultrasound probe 100 shown in FIG. 6 is of a so-called composite type and has a configuration in which the acoustic matching portion 12 and the vibrator 10 provided in the unit U are divided into four in the front-rear direction Y by the separation layer 21, the separation layer 22, and the extending part 116.

The extending part 116 extends from the central part of the upper wall part 112 in the front-rear direction Y to a position in contact with the acoustic lens 13. The separation layer 21 is provided between the extending part 113 and the extending part 116 so as to extend in the up-down direction Z in a state in which the upper wall part 112 and the acoustic lens 13 are connected to each other. The separation layer 22 is provided between the extending part 114 and the extending part 116 so as to extend in the up-down direction Z in a state in which the upper wall part 112 and the acoustic lens 13 are connected to each other. The separation layer 21 and the separation layer 22 are made of the same material as that of the separation layer 20.

According to the configuration shown in FIG. 6, in each of the four vibrators 10 in the unit U, the dematching layer 11B is in contact with only one end surface in the front-rear direction Y. Therefore, as described above, the quality of the ultrasound image can be improved.

Figure 7:
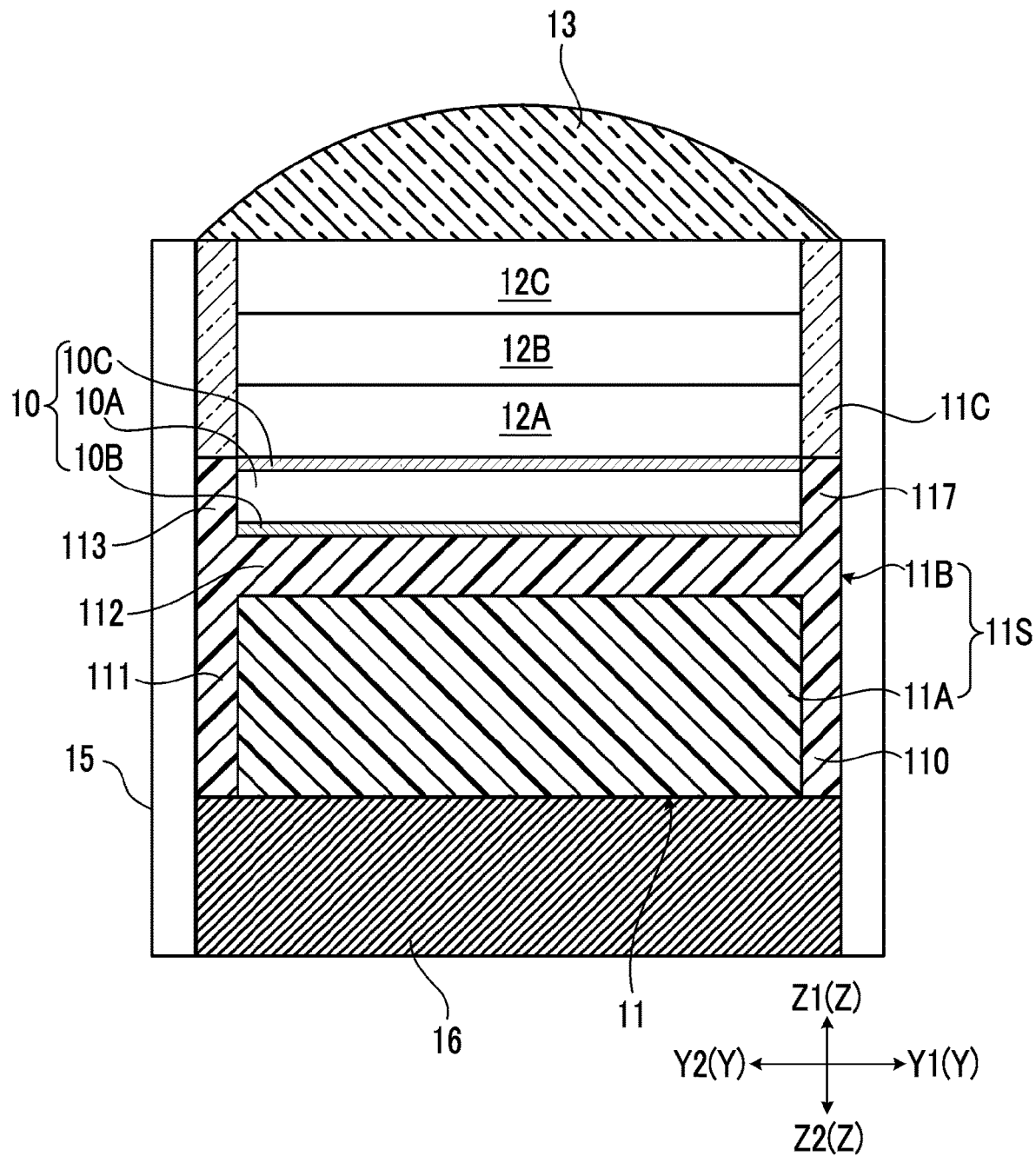
FIG. 7 is a view showing a fifth modification example of the ultrasound probe 100 and is a schematic cross-sectional view corresponding to FIG. 2.

FIG. 7 is a view showing a fifth modification example of the ultrasound probe 100 and is a schematic cross-sectional view corresponding to FIG. 2. The ultrasound probe 100 shown in FIG. 7 has a configuration in which an extending part 117 is added to the ultrasound probe 100 shown in FIG. 2. The extending part 117 extends from the rear end part of the upper wall part 112 in the upward direction Z1, between the case 15 and the vibrator 10, and is in contact with the rear end surface of the vibrator 10.

According to the configuration shown in FIG. 7, the dematching layer 11B is in contact with both the front end surface and the rear end surface of the vibrator 10. Therefore, as compared with the configuration of FIG. 2, the contact area between the dematching layer 11B and the vibrator 10 can be increased, and the heat of the vibrator 10 can be more efficiently dissipated to the heat dissipation member 16.

Figure 8:
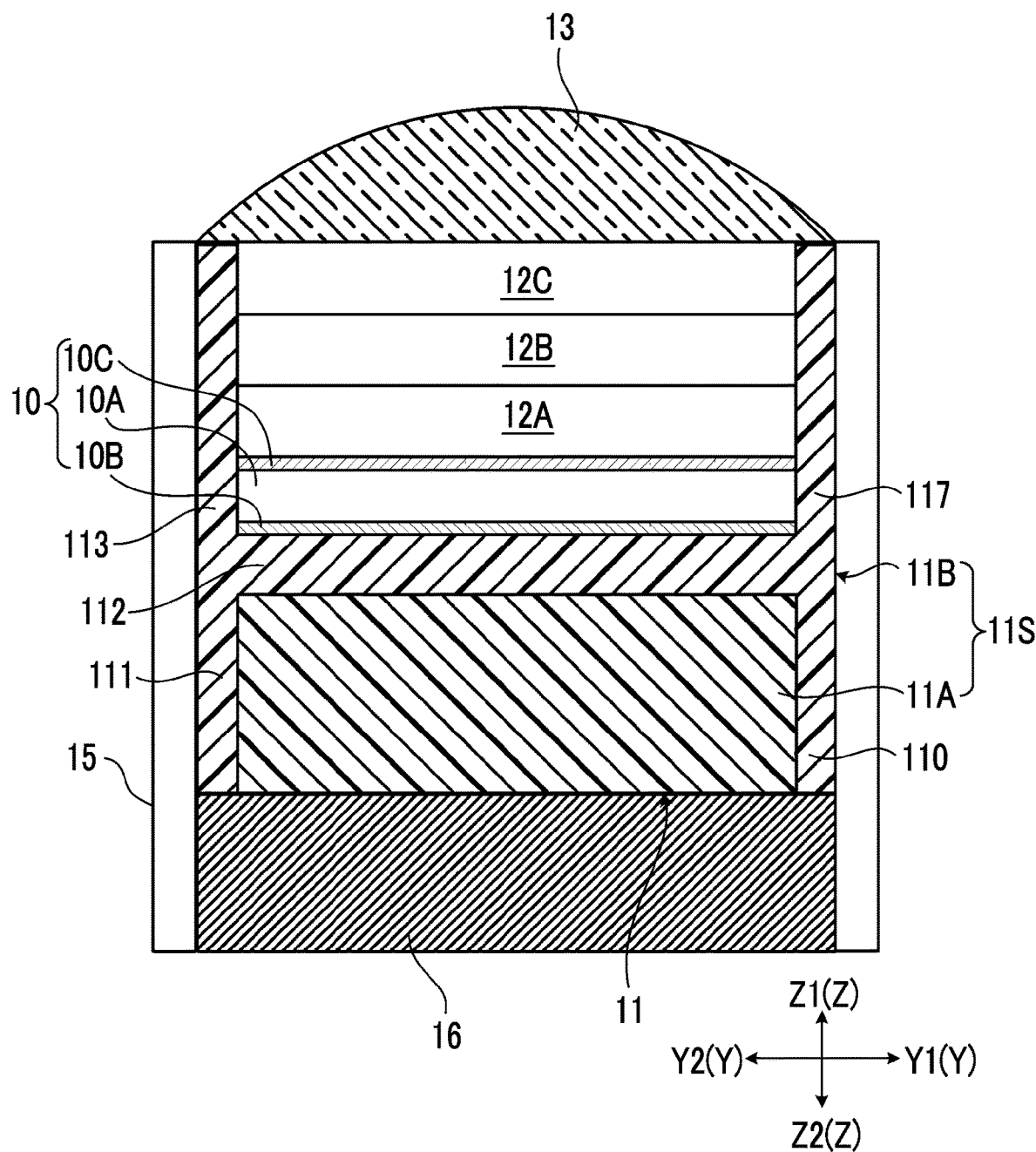
FIG. 8 is a view showing a sixth modification example of the ultrasound probe 100 and is a schematic cross-sectional view corresponding to FIG. 2.

FIG. 8 is a view showing a sixth modification example of the ultrasound probe 100 and is a schematic cross-sectional view corresponding to FIG. 2. The ultrasound probe 100 shown in FIG. 8 has a configuration in which the upper end surface of the extending part 113 extends to a position in contact with the acoustic lens 13 and the upper end surface of the extending part 117 extends to a position in contact with the acoustic lens 13, in the ultrasound probe 100 shown in FIG. 7. The extending part 113 is also in contact with the front end surface of the acoustic matching portion 12 in addition to the front end surface of the vibrator 10. The extending part 117 is also in contact with the rear end surface of the acoustic matching portion 12 in addition to the rear end surface of the vibrator 10.

According to the configuration shown in FIG. 8, since the dematching layer 11B is in contact with the acoustic matching portion 12 and the acoustic lens 13, the heat of the vibrator 10 can be more efficiently dissipated to the heat dissipation member 16 as compared with the configuration of FIG. 7.

Figure 9:
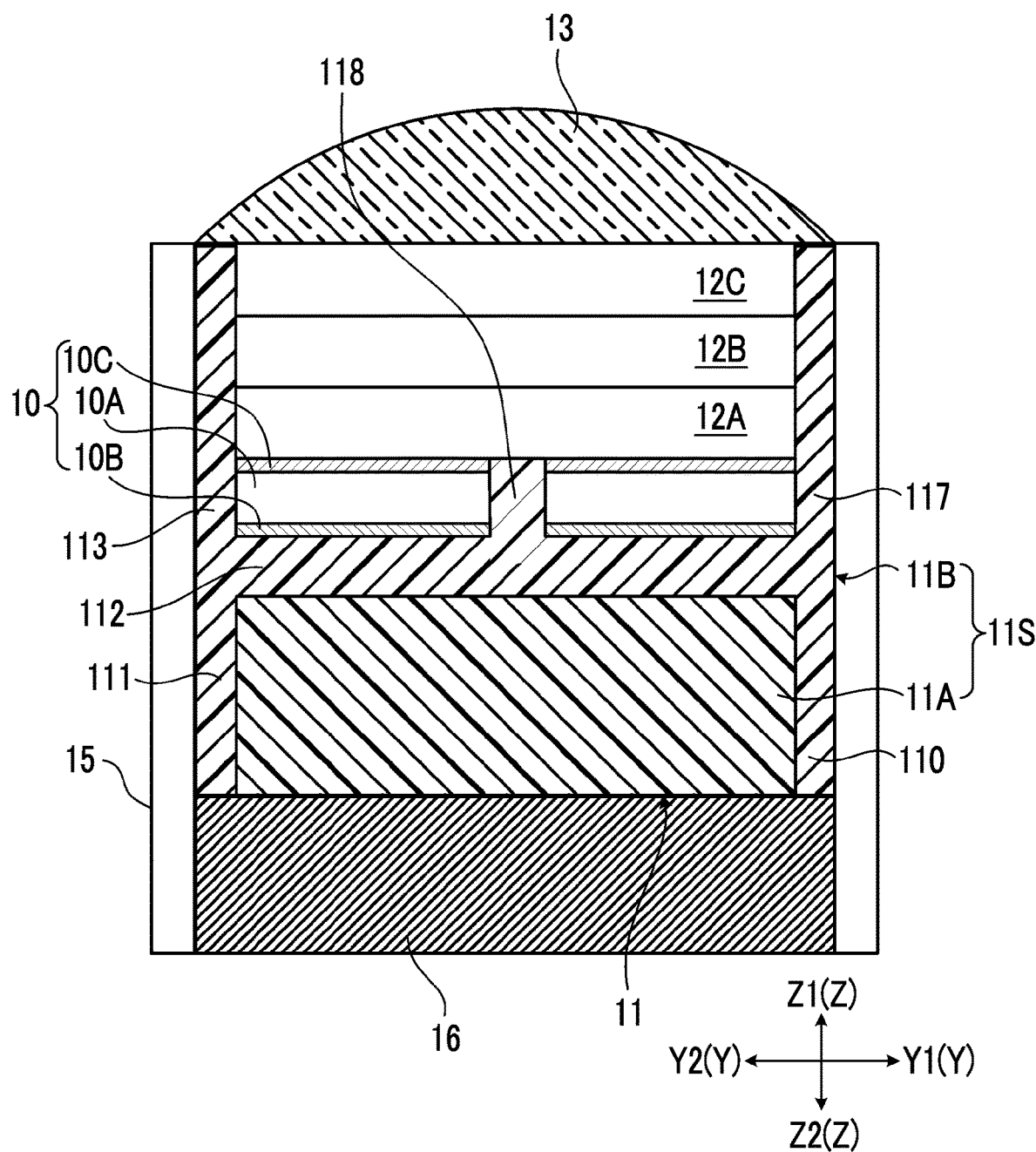
FIG. 9 is a view showing a seventh modification example of the ultrasound probe 100 and is a schematic cross-sectional view corresponding to FIG. 2.

FIG. 9 is a view showing a seventh modification example of the ultrasound probe 100 and is a schematic cross-sectional view corresponding to FIG. 2. The ultrasound probe 100 shown in FIG. 9 has a configuration in which an extending part 118 is added to the ultrasound probe 100 shown in FIG. 8. The extending part 118 is formed to extend from the central part of the upper wall part 112 in the front-rear direction Y to a contact position with the first acoustic matching layer 12A.

The ultrasound probe 100 shown in FIG. 9 is of a so-called composite type and has a configuration in which the vibrator 10 provided in the unit U is divided into two in the front-rear direction Y by the extending part 118.

According to the configuration shown in FIG. 9, the dematching layer 11B is in contact with the lower surface of the first acoustic matching layer 12A. Therefore, as compared with the configuration of FIG. 8, the contact area between the dematching layer 11B and the first acoustic matching layer 12A can be increased, and the heat of the vibrator 10 can be more efficiently dissipated to the heat dissipation member 16.

In FIG. 9, a configuration can also be employed in which an upper end surface of the extending part 118 extends to a position in contact with the acoustic lens 13. As a result, the heat of the vibrator 10 can be more efficiently dissipated to the heat dissipation member 16.

Figure 10:
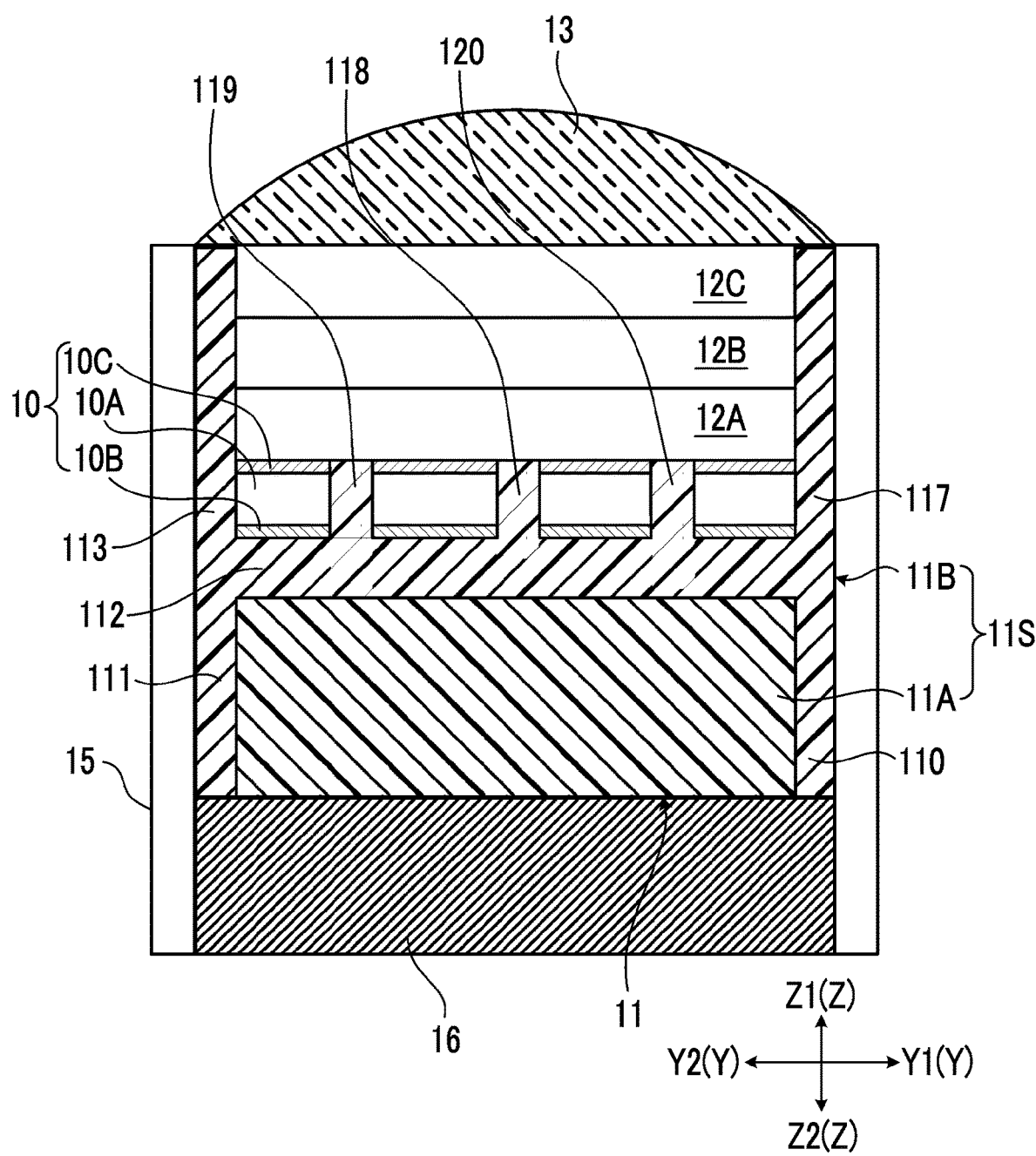
FIG. 10 is a view showing an eighth modification example of the ultrasound probe 100 and is a schematic cross-sectional view corresponding to FIG. 2.

FIG. 10 is a view showing an eighth modification example of the ultrasound probe 100 and is a schematic cross-sectional view corresponding to FIG. 2. The ultrasound probe 100 shown in FIG. 10 has a configuration in which an extending part 119 and an extending part 120 are added to the ultrasound probe 100 shown in FIG. 9. The extending part 119 is formed between the extending part 118 and the extending part 113 so as to extend in the upward direction Z1 in a state in which the upper wall part 112 and the first acoustic matching layer 12A are connected to each other. The extending part 120 is formed between the extending part 118 and the extending part 117 so as to extend in the upward direction Z1 in a state in which the upper wall part 112 and the first acoustic matching layer 12A are connected to each other.

The ultrasound probe 100 shown in FIG. 10 is of a so-called composite type and has a configuration in which the vibrator 10 provided in the unit U is divided into four in the front-rear direction Y by the extending part 118, the extending part 119, and the extending part 120. A configuration can also be employed in which an upper end surface of each of the extending part 118, the extending part 119, and the extending part 120 extends to a position in contact with the acoustic lens 13.

According to the configuration shown in FIG. 10, the dematching layer 11B is in contact with a plurality of locations on the lower surface of the first acoustic matching layer 12A. Therefore, as compared with the configuration of FIG. 9, the contact area between the dematching layer 11B and the first acoustic matching layer 12A can be increased, and the heat of the vibrator 10 can be more efficiently dissipated to the heat dissipation member 16.

Figure 11:
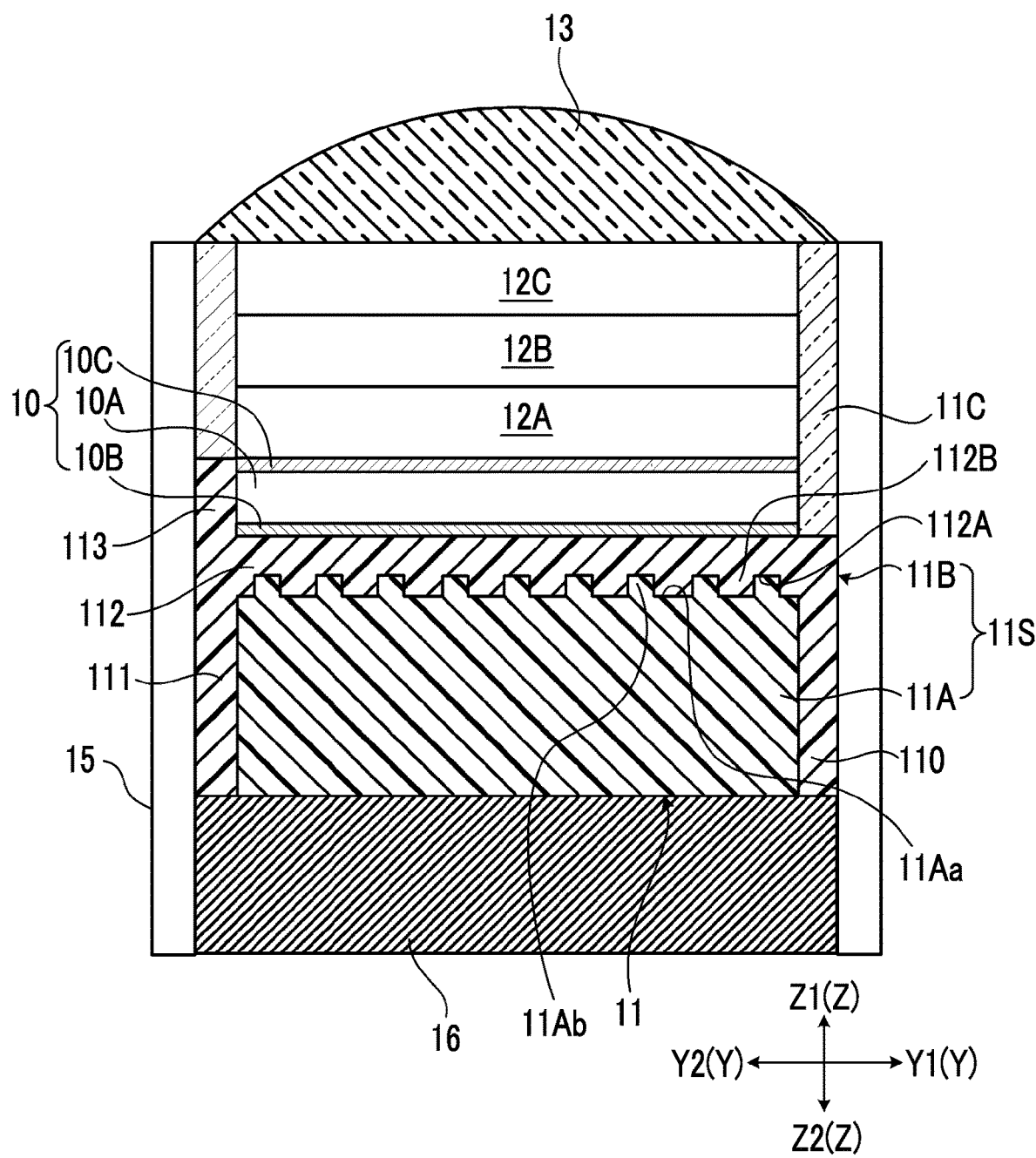
FIG. 11 is a view showing a ninth modification example of the ultrasound probe 100 and is a schematic cross-sectional view corresponding to FIG. 2.

FIG. 11 is a view showing a ninth modification example of the ultrasound probe 100 and is a schematic cross-sectional view corresponding to FIG. 2. The ultrasound probe 100 shown in FIG. 11 is different from that of FIG. 2 in that an interface between the upper wall part 112 and the backing layer 11A has an uneven shape.

Specifically, a plurality of recessed portions 112A recessed in the upward direction Z1 are formed on the lower surface of the upper wall part 112. In other words, a plurality of protruding portions 112B protruding in the downward direction Z2 are formed on the lower surface of the upper wall part 112.

In addition, a plurality of recessed portions 11Aa recessed in the downward direction Z2 are formed on the upper surface of the backing layer 11A. In other words, a plurality of protruding portions 11Ab protruding in the upward direction Z1 are formed on the upper surface of the backing layer 11A.

As shown in the figure, the recessed portion 112A and the protruding portion 11Ab are fitted to each other, and the protruding portion 112B and the recessed portion 11Aa are fitted to each other. As described above, with the ultrasound probe 100 shown in FIG. 11, the contact area between the upper wall part 112 and the backing layer 11A can be increased as compared with the configurations of FIGS. 2 to 10. As a result, the heat of the vibrator 10 can be more efficiently dissipated to the heat dissipation member 16.

Figure 12:
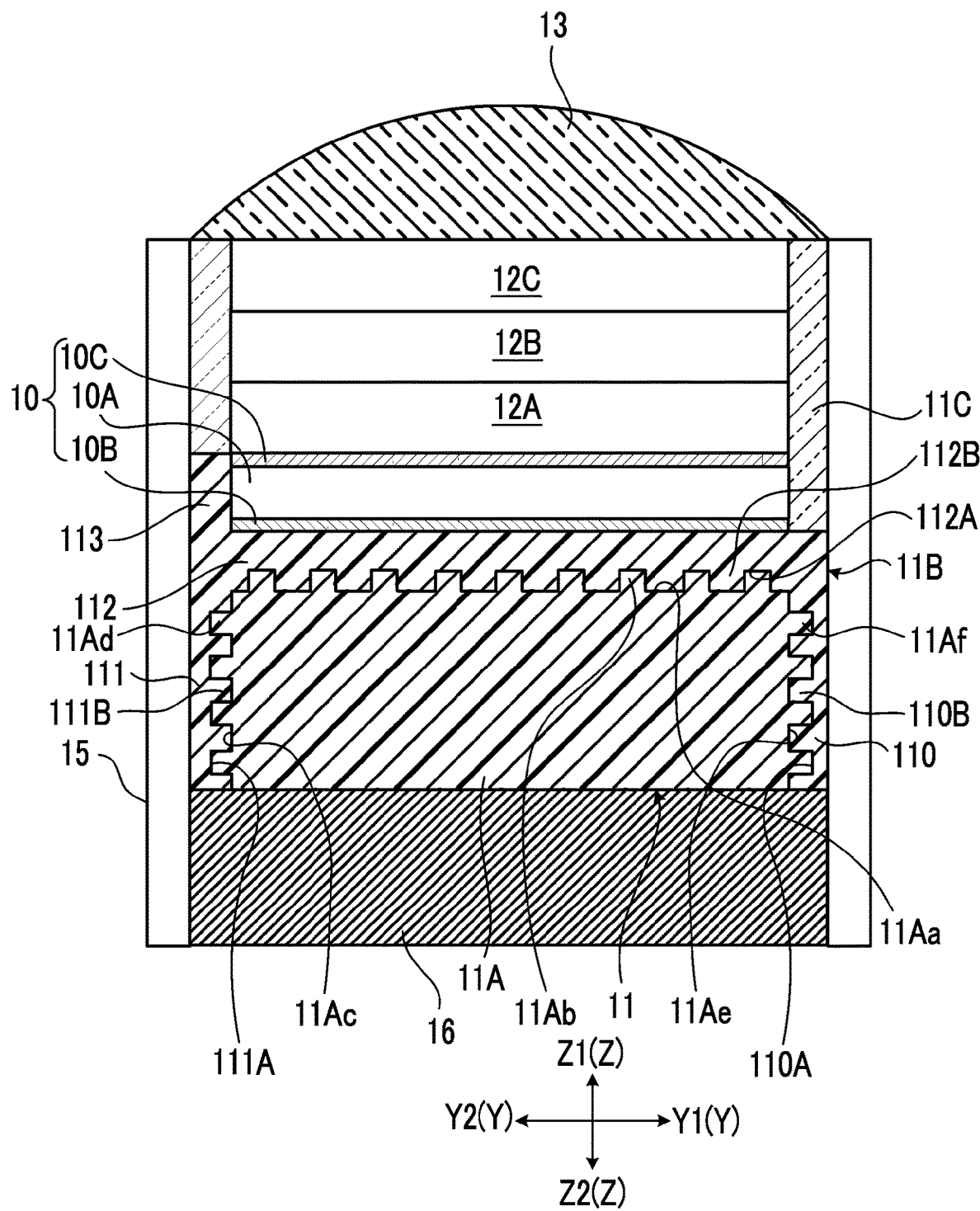
FIG. 12 is a view showing a tenth modification example of the ultrasound probe 100 and is a schematic cross-sectional view corresponding to FIG. 2.

FIG. 12 is a view showing a tenth modification example of the ultrasound probe 100 and is a schematic cross-sectional view corresponding to FIG. 2. The ultrasound probe 100 shown in FIG. 12 is different from that of FIG. 11 in that an interface between the rear wall part 110 and the backing layer 11A and an interface between the front wall part 111 and the backing layer 11A each have an uneven shape.

Specifically, a plurality of recessed portions 111A recessed in the forward direction Y2 are formed on a rear surface of the front wall part 111. In other words, a plurality of protruding portions 111B protruding in the rearward direction Y1 are formed on the rear surface of the front wall part 111. A plurality of recessed portions 11Ac recessed in the rearward direction Y1 are formed on a front surface of the backing layer 11A. In other words, a plurality of protruding portions 11Ad protruding in the forward direction Y2 are formed on the front surface of the backing layer 11A.

The recessed portion 111A and the protruding portion 11Ad are fitted to each other, and the protruding portion 111B and the recessed portion 11Ac are fitted to each other. As described above, with the ultrasound probe 100 shown in FIG. 12, the contact area between the front wall part 111 and the backing layer 11A can be increased as compared with the configurations of FIGS. 2 to 11. As a result, the heat of the vibrator 10 can be more efficiently dissipated to the heat dissipation member 16.

Further, a plurality of recessed portions 110A recessed in the rearward direction Y1 are formed on a front surface of the rear wall part 110. In other words, a plurality of protruding portions 110B protruding in the forward direction Y2 are formed on the front surface of the rear wall part 110. A plurality of recessed portions 11Ae recessed in the forward direction Y2 are formed on a rear surface of the backing layer 11A. In other words, a plurality of protruding portions 11Af protruding in the rearward direction Y1 are formed on the rear surface of the backing layer 11A.

The recessed portion 110A and the protruding portion 11Af are fitted to each other, and the protruding portion 110B and the recessed portion 11Ae are fitted to each other. As described above, with the ultrasound probe 100 shown in FIG. 12, the contact area between the rear wall part 110 and the backing layer 11A can be increased as compared with the configurations of FIGS. 2 to 11. As a result, the heat of the vibrator 10 can be more efficiently dissipated to the heat dissipation member 16.

In the ultrasound probe 100 shown in FIG. 12, the interface between the front wall part 111 and the backing layer 11A may be flat, the interface between the rear wall part 110 and the backing layer 11A may be flat, or the interface between the upper wall part 112 and the backing layer 11A may be flat. Further, the cross-sectional shape of the protruding portion or the recessed portion is not limited to the shape shown in FIG. 12 and may be a semicircular shape, a triangular shape, or the like. The recessed portions or the protruding portions do not need to be regularly arranged and may be randomly disposed.

At least the following matters are described in the present specification.

(1)
An ultrasound probe comprising:
a plurality of vibrators that are arranged in a first direction, each vibrator having a first surface which is located on a side on which the vibrator transmits and receives an ultrasound wave and a second surface opposite to the first surface; and
a support portion that supports the second surface,
in which the support portion includes a first support portion that is in contact with the second surface and that reflects, to the vibrator, an ultrasound wave from the vibrator toward the support portion,
a direction from the vibrator toward the support portion is defined as a second direction,
a direction intersecting the first direction and the second direction is defined as a third direction, and
the first support portion is in contact with at least a part of an end surface of the vibrator in the third direction.

According to (1), the first support portion is in contact with not only the second surface of the vibrator but also the end surface of the vibrator. Therefore, by making the thermal conductivity of the first support portion, for example, equivalent to or higher than the thermal conductivity of the vibrator, the majority of heat generated in the vibrator can be dissipated through the first support portion to, for example, a member having a high thermal conductivity, such as a housing, located away from the subject under examination. As a result, it is possible to reduce the heat generated in the ultrasound probe and transferred to the subject under examination, and it is possible to reduce constraints on a driving method of the plurality of vibrators. For example, it is also possible to increase a driving voltage of the vibrator, and it is possible to improve the sensitivity or the image quality of the ultrasound image generated by using the ultrasound probe.

(2)
The ultrasound probe according to (1),
in which the first support portion is in contact with one of both end surfaces of the vibrator in the third direction and is not in contact with the other of the both end surfaces of the vibrator.

According to (2), only one of both end surfaces of the vibrator serves as a fixed end, so that the difference between the resonance frequency of the vibration of the vibrator in the third direction and the frequency of the vibration of the vibrator in the second direction can be increased. As a result, in a case where an ultrasound image is generated using the vibration of the vibrator in the second direction, the quality of the ultrasound image can be improved.

(3)
The ultrasound probe according to (1) or (2),
in which a plurality of vibrator groups each including the plurality of vibrators are provided, and
the plurality of vibrator groups are arranged in the third direction.

According to (3), as the width of the vibrator in the third direction and the thickness of the vibrator in the second direction approach each other, the influence of the vibration of the vibrator in the third direction on the ultrasound image tends to be large. Therefore, by making only one of both end surfaces of the vibrator serve as a fixed end, it is possible to more significantly obtain the effect of improving the image quality of the ultrasound image.

(4)
The ultrasound probe according to (1),
in which the first support portion is in contact with both end surfaces of the vibrator in the third direction.

According to (4), since the contact area between the vibrator and the first support portion is increased, heat can be dissipated more efficiently.

(5)
The ultrasound probe according to any one of (1) to (4), further comprising:
an acoustic matching portion that is disposed on an opposite side of the vibrator from a support portion side, in which the first support portion is in contact with at least a part of an end surface of the acoustic matching portion in the third direction.

According to (5), the heat transferred to the acoustic matching portion can be dissipated by the first support portion. As a result, the heat generated in the ultrasound probe and transferred to the subject under examination can be further reduced.

(6)

The ultrasound probe according to (5), further comprising:
- an acoustic lens that is disposed on an opposite side of the acoustic matching portion from a vibrator side,
- in which the first support portion is in contact with the acoustic lens.

According to (6), the heat transferred to the acoustic lens can be dissipated by the first support portion. As a result, the heat generated in the ultrasound probe and transferred to the subject under examination can be further reduced.

(7)

The ultrasound probe according to any one of (1) to (6),
- in which the first support portion has a thermal conductivity higher than a thermal conductivity of the vibrator.

According to (7), the heat generated in the vibrator can be dissipated through the first support portion to, for example, a member having a high thermal conductivity, such as a housing. As a result, the heat generated in the ultrasound probe and transferred to the subject under examination can be reduced.

(8)

The ultrasound probe according to (7),
- in which the support portion includes a second support portion that is disposed on an opposite side of the first support portion from a vibrator side and that restrains the ultrasound wave from the vibrator toward the support portion from returning to the vibrator,
- a thermal conductivity of the second support portion is lower than the thermal conductivity of the first support portion, and
- the first support portion is in contact with one or both of both end surfaces of the second support portion in the third direction.

According to (8), the first support portion having a high thermal conductivity can be disposed wider in a region opposite to the subject under examination side. Therefore, the heat generated in the vibrator can be more efficiently dissipated to the side opposite to the subject under examination side.

(9)

The ultrasound probe according to any one of (1) to (8), further comprising:
- a heat dissipation member that is disposed on an opposite side of the first support portion from a vibrator side,
- in which the first support portion is connected to the heat dissipation member.

According to (9), the heat generated in the vibrator can be more efficiently dissipated to the side opposite to the subject under examination side.

(10)

The ultrasound probe according to any one of (1) to (9),
- in which the support portion includes a second support portion that is disposed on an opposite side of the first support portion from a vibrator side and that restrains the ultrasound wave from the vibrator toward the support portion from returning to the vibrator,
- a recessed portion or a protruding portion is formed on a contact surface of the first support portion, the contact surface being in contact with the second support portion, and
- a protruding portion that is fitted into the recessed portion or a recessed portion into which the protruding portion of the first support portion is fitted is formed on a contact surface of the second support portion, the contact surface being in contact with the first support portion.

(11)

An ultrasound diagnostic apparatus comprising:
- the ultrasound probe according to any one of (1) to (10).

EXPLANATION OF REFERENCES

10A: piezoelectric body
10B: signal electrode
10C: ground electrode
10: vibrator
11A: backing layer
11B: dematching layer
11C: protective layer
11S: support portion
11: functional part
12A: first acoustic matching layer
12B: second acoustic matching layer
12C: third acoustic matching layer
12: acoustic matching portion
13: acoustic lens
14, 20, 21, 22: separation layer
15: case
16: heat dissipation member
100: ultrasound probe
110: rear wall part
111: front wall part
112: upper wall part
113, 114, 115, 116, 117, 118, 119, 120: extending part
110A, 111A, 112A: recessed portion
110B, 111B, 112B: protruding portion
11Aa, 11Ac, 11Ae: recessed portion
11Ab, 11Ad, 11Af: protruding portion

What is claimed is:

1. An ultrasound probe comprising:
a plurality of vibrators that are arranged in a first direction, each vibrator having a first surface which is located on a side on which the vibrator transmits and receives an ultrasound wave and a second surface opposite to the first surface; and
a support portion that supports the second surface,
wherein the support portion includes a first support portion that is in contact with the second surface and that reflects, to the vibrator, an ultrasound wave from the vibrator toward the support portion,
a direction from the vibrator toward the support portion is defined as a second direction,
a direction intersecting the first direction and the second direction is defined as a third direction,
the first support portion is in contact with at least a part of an end surface of the vibrator in the third direction, and
the first support portion is formed of a single member.

2. The ultrasound probe according to claim 1,
wherein the first support portion is in contact with one of both end surfaces of the vibrator in the third direction and is not in contact with the other of the both end surfaces of the vibrator.

3. The ultrasound probe according to claim 2,
wherein a plurality of vibrator groups each including the plurality of vibrators are provided, and
the plurality of vibrator groups are arranged in the third direction.

4. The ultrasound probe according to claim 1,
wherein the first support portion is in contact with both end surfaces of the vibrator in the third direction.

5. The ultrasound probe according to claim 1, further comprising:
an acoustic matching portion that is disposed on an opposite side of the vibrator from a support portion side,
wherein the first support portion is in contact with at least a part of an end surface of the acoustic matching portion in the third direction.

6. The ultrasound probe according to claim 5, further comprising:
an acoustic lens that is disposed on an opposite side of the acoustic matching portion from a vibrator side,
wherein the first support portion is in contact with the acoustic lens.

7. The ultrasound probe according to claim 1,
wherein the first support portion has a thermal conductivity higher than a thermal conductivity of the vibrator.

8. The ultrasound probe according to claim 7,
wherein the support portion includes a second support portion that is disposed on an opposite side of the first support portion from a vibrator side and that restrains the ultrasound wave from the vibrator toward the support portion from returning to the vibrator,
a thermal conductivity of the second support portion is lower than the thermal conductivity of the first support portion, and
the first support portion is in contact with one or both of both end surfaces of the second support portion in the third direction.

9. The ultrasound probe according to claim 1, further comprising:
a heat dissipation member that is disposed on an opposite side of the first support portion with respect to a vibrator side,
wherein the first support portion is connected to the heat dissipation member.

10. The ultrasound probe according to claim 1,
wherein the support portion includes a second support portion that is disposed on an opposite side of the first support portion from a vibrator side and that restrains the ultrasound wave from the vibrator toward the support portion from returning to the vibrator,
a recessed portion or a protruding portion is formed on a contact surface of the first support portion, the contact surface of the first support portion being in contact with the second support portion, and
a protruding portion that is fitted into the recessed portion or a recessed portion into which the protruding portion of the first support portion is fitted is formed on a contact surface of the second support portion, the contact surface of the second support portion being in contact with the first support portion.

11. An ultrasound diagnostic apparatus comprising:
an ultrasound probe that comprises:
a plurality of vibrators that are arranged in a first direction, each vibrator having a first surface which is located on a side on which the vibrator transmits and receives an ultrasound wave and a second surface opposite to the first surface; and
a support portion that supports the second surface,
wherein the support portion includes a first support portion that is in contact with the second surface and that reflects, to the vibrator, an ultrasound wave from the vibrator toward the support portion,
a direction from the vibrator toward the support portion is defined as a second direction,
a direction intersecting the first direction and the second direction is defined as a third direction,
the first support portion is in contact with at least a part of an end surface of the vibrator in the third direction, and
the first support portion is formed of a single member.

* * * * *